Sept. 1, 1959  C. H. SAVIT  2,902,668
PRESSURE SENSITIVE DEVICE
Filed May 28, 1956

INVENTOR.
CARL H. SAVIT,
BY William R. Hensley
ATTORNEY.

United States Patent Office 2,902,668
Patented Sept. 1, 1959

2,902,668

PRESSURE SENSITIVE DEVICE

Carl H. Savit, Van Nuys, Calif., assignor to Western Geophysical Company of America, Los Angeles, Calif., a corporation of Delaware Application May 28, 1956, Serial No. 587,802

7 Claims. (Cl. 340—17)

This invention relates to improved pressure sensitive devices and more particularly to an improvement in pressure sensitive devices of the general type in which a diaphragm or structural element is movable in response to pressure variations.

In many applications detection of acoustical and other compressional waves is accomplished by means of a pressure sensitive device wherein the position of a thin structural element, or diaphragm, is varied with relation to other elements in the device in response to variations in pressure upon the diaphragm. For example, a type of detector commonly used in geophysical exploration is a pressure sensitive device in which an iron diaphragm, in response to pressure upon the diaphragm, moves with relation to an electromagnet causing variations in the magnetic flux, reluctance and voltage of the device which are calibrated to obtain a measurement of the pressure upon the device. One example of a pressure sensitive device of this general type is the magnetophone shown and described in U.S. Patent No. 2,191,121 for "Geological Surveying Apparatus," issued February 20, 1940, to L. B. Slichter. In such devices, the diaphragm is most generally circular and mounted such that the periphery is stationary while the circular central area of the diaphragm flexes, in response to pressure changes or impulses, to vary the spacing between the diaphragm and the electromagnet within the device. This in turn varies the electrical characteristics of the device. The diaphragm must be free to travel within a limited and well defined range as a prerequisite to the operation of the device.

Under circumstances in which the impulsive force is severe, such as an explosive shock wave in underwater geophysical exploration, the moving diaphragm is often permanently deformed, distorted, or destroyed. The diaphragm is so mounted and designed that in normal operation the amount of travel which the diaphragm experiences in response to pressure or compressional waves causes the diaphragm to be stressed well within its elastic limit. However, the pressure to which the diaphragm is subjected by a shock wave of high magnitude often causes the diaphragm to exceed the limit of normal travel and causes localized stresses beyond the yield point. For example, in connection with the magnetophone shown in Pat. No. 2,191,121, supra, at its limit of normal travel the diaphragm strikes the pole pieces of the electromagnets. Further pressure upon the diaphragm causes deformation, since the area surrounding the pole pieces may continue to travel and be stressed beyond the elastic limit. Sufficient pressure is encountered in some cases to cause shearing of the diaphragm at the areas of maximum stress.

Accordingly, it is an object of the present invention to provide an improved pressure sensitive device which is not damaged by pressure variations or shock waves in excess of those encountered in normal operation of the device.

It is another object of the present invention to provide a means for limiting the stresses upon the pressure responsive element in a pressure sensitive device of the general type in which the element is movable in response to pressure variations upon the device.

It is a further object of the present invention to provide a pressure sensitive device which allows the required degree of freedom of movement of a pressure responsive element but in which the element cannot be subjected to stresses beyond the elastic limit.

The present invention comprises in combination with a pressure sensitive device having a movable pressure responsive element, a rigidly positioned supporting member of electrically and magnetically inert material. The supporting member is formed such that a supporting surface which conforms to the curvature of the pressure responsive element at its position of maximum desired travel is provided adjacent to the surface of the pressure responsive element at this position. Thus, at the position of maximum travel of the element, the element is supported by the member and additional forces upon the element are transmitted to the supporting member.

The novel features which are believed to be characteristic of the invention, both as to its organization and method of operation, together with further objects and advantages thereof, will be better understood from the following description considered in connection with the accompanying drawing, in which two embodiments of the invention are illustrated by way of example. It is to be expressly understood, however, that the drawing is for the purpose of illustration and description only and is not intended as a definition of the limits of the invention.

Figure 1:
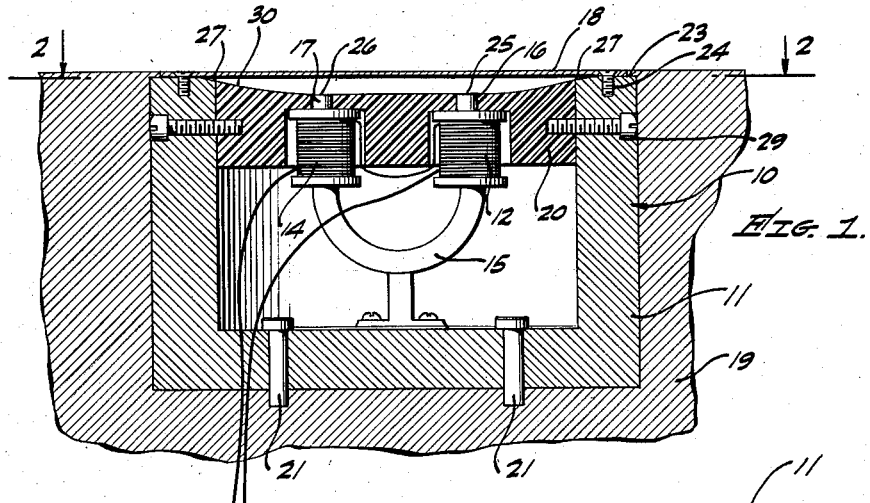
Fig. 1 is a cross-sectional view in elevation of a presently preferred embodiment of the present invention.
Figure 2:
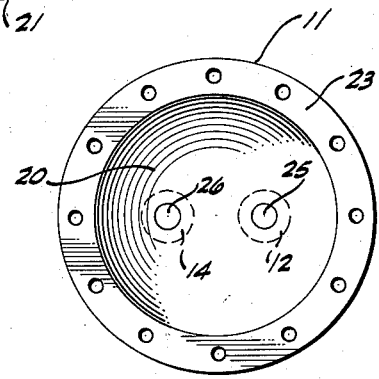
Fig. 2 is a view taken along line 2—2 of Fig. 1.

Referring to the figures, and particularly Figs. 1 and 2, an illustrative pressure sensitive magnetophone utilizing the present invention for use as a detector of pressure waves is shown. The pressure sensitive device 10 comprises a housing 11; first and second inductance coils 12, 14; a U-shaped core 15, the legs of which extend through the coils as pole pieces 16, 17; a pressure responsive diaphragm 18; and a supporting member 20 in accordance with the present invention for limiting the travel of the diaphragm.

As a detector for underwater compressional waves the pressure sensitive device 10 is carried within a casing 19 to which the housing 11 is firmly affixed. The housing is formed of non-magnetizable material such as brass and is held to the casing 19 by bolts 21. Within the housing are provided the two inductance coils, 12 and 14 which, together with the U-shaped core 15, form a magnet system to set up or generate a current when the diaphragm 18 vibrates. The coils 12, 14 may be polarized with direct current, as shown, or permanent magnets may be used. The diaphragm 18 is affixed to the end 23 of the housing by means of bolts 24 and made watertight. During normal operation the diaphragm will be flexed inward toward the ends 25, 26 of the respective pole pieces 16, 17 in response to pressure upon the diaphragm. Severe impulses will cause the diaphragm to move to the position at which the diaphragm contacts the ends 25, 26 of the pole pieces. In the state of the art prior to the present invention, additional pressure causes excessive stresses to develop in the localized areas surrounding the pole pieces and along the inner circumference 27 of the end 23 which often exceed the yield point of the diaphragm and result in permanent deformation. If the shock wave is of sufficient intensity the diaphragm will sometimes shear along these lines.

In accordance with the present invention an electrically and magnetically inert supporting member 20 is positioned behind the diaphragm with a supporting surface conforming to the configuration of the diaphragm at its position of maximum desired travel. In the embodiment shown in Figs. 1 and 2, the supporting member 20 is a body of phenolic resin or similar high strength plastic material formed with an outer diameter substantially equal to the inner diameter of the housing 11. The supporting member is affixed to the housing by a plurality of bolts 29 such that the upper edge of the member is coincident with the inner edge 27 of the end 23. Openings in the member 20 are provided to accommodate the coils 12, 14 and pole pieces 16, 17 such that the pole pieces extend through the member and are flush with the upper surface thereof. The supporting surface of the member is machined or otherwise formed to conform with the curvature of the diaphragm 18 at its position in which it contacts the ends of the pole pieces. The upper or supporting surface 30 of the supporting member is continuous with all supporting surfaces for the diaphragm and is smooth and free of abrupt changes. That is, the upper surface 30 is flush with the ends 25, 26 of the pole pieces and curves smoothly to the edge of the housing where the diaphragm is affixed. To prevent an abrupt change in curvature, the junction of the housing and adjacent edge of the support member may be radiused or tapered as shown.

Thus, in operation, when a pressure variation of excessive intensity occurs on the diaphragm the diaphragm will move inward to its position of maximum travel at which it is in contact with the ends of the pole pieces. At this position the lower surface of the diaphragm is also supported over the remainder of its entire area by the supporting member 20. The supporting member therefore prevents additional travel and any additional force on the diaphragm is transmitted to the supporting member. The diaphragm cannot be stressed beyond the yield point or elastic limit and no permanent deformation or destruction can occur.

Openings through the surface of the supporting member may be provided when necessary to equalize the static pressure on both sides of the diaphram, or for other purposes. The size of the openings must be sufficiently small that pressure upon the diaphragm will not produce localized stresses. That is, a perforated supporting member may be used when desirable if the area of the perforations is not large enough to allow sufficient travel of the diaphragm into the opening to cause excessive stress of the diaphragm in that area. The allowable size of openings in the surface is dependent upon the shape of the openings, the thickness of the diaphragm, and other factors, and can be readily determined by routine experiment of one skilled in the art. When the pressure sensitive device is of the type wherein an element is movable within the body, openings or chambers are provided within the supporting member for such movement, while still maintaining the supporting surface substantially continuous.

Figure 4:
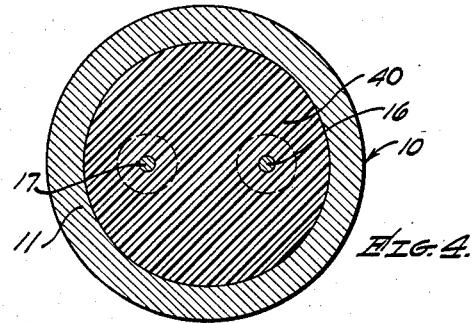
Fig. 4 is a view taken along line 4—4 of Fig. 3.
Figure 3:
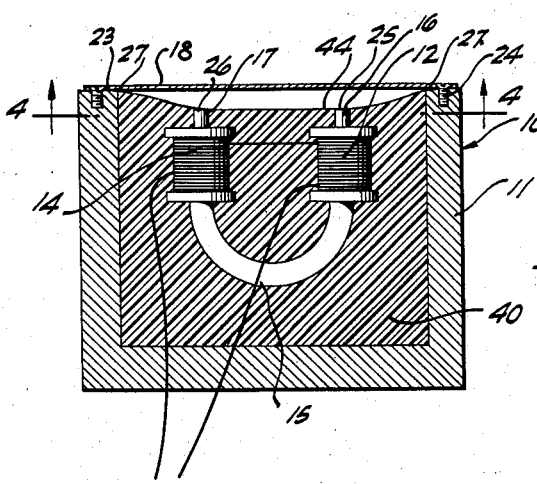
Fig. 3 is a cross-sectional view of an alternative embodiment of the present invention.

Referring now to Figs. 3 and 4, an alternative embodiment of the present invention as applied to the typical detector of Fig. 1 is shown. In accordance with this embodiment of the present invention the supporting member 40 is again a mass of electrically and magnetically inert material, however, in this embodiment the inert material fills all of the unoccupied space within the housing behind the diaphragm and positions the coils 12, 14 and core 15. In order to form the supporting member 40 in this embodiment, the housing is filled with a thermosetting plastic material such as epoxy resin with the coils and U-shaped core properly positioned. The supporting member 40 is then machined or otherwise smoothed in the housing to form the supporting surface 44 to the configuration of the diaphragm at its position of desired maximum travel as described hereinbefore.

The supporting surface 44 is continuous with the exposed ends 25, 26 of the pole pieces and curves smoothly to the end 23 of the housing where the diaphragm is supported. The inner edge of the end of the housing is again tapered or radiused to avoid sharp edges or abrupt changes in curvature.

In operation, as described hereinbefore, the diaphragm is free to travel with relation to the electromagnet system throughout the desired functional range. However, when pressure variations of excessive intensity occur on the diaphragm, the diaphragm is supported over its entire area by the ends of the pole pieces and the supporting surface 44 of the supporting member 40. The diaphragm cannot be stressed beyond its elastic limit and no deformation or distortion can occur.

In applications wherein the movement of the diaphragm in a pressure sensitive device must be limited as described hereinbefore, but in which the device is of a type which does not function electromagnetically, the supporting member need not be formed of material which is electrically and magnetically inert.

Although detectors of the type wherein the pressure responsive element is supported about its periphery have been shown and described as illustrative, the present invention can also be used to advantage in pressure sensitive devices in which the pressure responsive element is affixed at or near the center and the periphery is movable. In such an embodiment the supporting surface would assume a convex rather than concave configuration.

Thus, the present invention provides a pressure sensitive device which allows freedom of movement of a pressure responsive element in the requisite range of movement, but which limits movement beyond the desired range and prevents excessive stresses in the pressure responsive element.

What is claimed is:

1. In a pressure sensitive device having a pressure responsive element movably mounted in a housing and movable with respect to a surface of a fixed element in said housing, a supporting member comprising: an inert mass of material, said material being rigidly supported interiorly of said housing surrounding said fixed element and juxtaposed to said pressure responsive element, a supporting surface defined by said material adjacent said pressure responsive element, said supporting surface being continuous and of continuous slope with said surface of said fixed element and conforming to a predetermined maximum elastic deformation of said pressure responsive element at the position of maximum desired travel, whereby said pressure responsive element is supported in a condition of elastic deformation at its position of maximum desired travel by said supporting member.

2. In a pressure responsive device having a pressure responsive diaphragm movably mounted in a housing and movable with respect to a surface of an element positioned in said housing, a supporting member comprising: a mass of inert material, said mass of material being rigidly affixed interiorly of said housing, a supporting surface defined by said mass juxtaposed to said diaphragm surrounding and continuous with said surface of said element in such manner as to be free of abrupt changes of slope, said supporting surface conforming in configuration to a predetermined maximum elastic deformation of said diaphragm at the position of maximum desired travel of said diaphragm, and being adjacent to said diaphragm at said position whereby said supporting member supports said diaphragm in a condition of elastic deformation at the position of maximum desired travel and limits the travel thereof.

3. In a pressure sensitive device having a pressure responsive diaphragm mounted at an open end of a substantially cylindrical housing in which the periphery of the diaphragm is supported on the housing and the center of the diaphragm is movable with respect to a surface of an element in the housing in response to pressure variations on the diaphragm, means for supporting the diaphragm comprising: a supporting member of inert material rigidly affixed in said housing adjacent said diaphragm, said supporting member defining a supporting surface, said supporting surface being continuous and of continuous slope with said surface of said element and having a configuration equal to a predetermined maximum elastic deformation of said diaphragm at the position of maximum desired travel of said diaphragm, said supporting surface being adjacent said diaphragm at said position of maximum travel whereby said supporting member supports said diaphragm in a condition of elastic deformation at said position of maximum travel and limits the travel thereof.

4. In a pressure sensitive device having a pressure responsive diaphragm mounted at an open end of a substantially cylindrical housing in which the periphery of the diaphragm is supported on the housing and the center of the diaphragm is movable with respect to a surface of an element in the housing in response to pressure variations on the diaphragm, means for supporting the diaphragm comprising: a supporting member of electrically and magnetically inert rigid material filling said housing and defining a supporting surface, said supporting surface being continuous and of continuous slope with said surface of said element and having a configuration equal to a predetermined maximum elastic deformation of said diaphragm at the position of maximum desired travel of said diaphragm, said supporting surface being adjacent said diaphragm in a condition of elastic deformation at said position of maximum travel whereby said supporting member supports said diaphragm at said position of maximum desired travel and limits the travel thereof.

5. In a pressure sensitive device having a pressure responsive diaphragm mounted at an open end of a substantially cylindrical housing in which the periphery of the diaphragm is supported on the housing and the center of the diaphragm is movable with respect to a surface of a pole piece of an electromagnet within the housing, in response to pressure variations on the diaphragm, means for supporting the diaphragm comprising: a supporting member of electrically and magnetically inert rigid material filling said housing, a supporting surface defined by said supporting member, said supporting surface being continuous with said surface of said pole piece and having a configuration equal to a predetermined maximum elastic deformation of said diaphragm at the position of maximum desired travel of said diaphragm at which said diaphragm is in contact with said surface of said pole piece, said supporting surface being adjacent said diaphragm at said position of maximum travel whereby said surface of said pole piece and said supporting surface support said diaphragm in a condition of elastic deformation at said position of maximum desired travel and limit the travel thereof.

6. A pressure sensitive device comprising: a substantially cylindrical housing of non-magnetizable material, a flexible diaphragm mounted within said housing, said diaphragm being affixed in said housing at the periphery of said diaphragm such that the center of said diaphragm is movable within said housing, an electromagnet positioned within said housing and having a pole piece with a surface thereof proximate to, but spaced from, said diaphragm, a supporting member of inert material rigidly affixed within said housing adjacent said diaphragm and surrounding said pole piece, said supporting member defining a supporting surface, said supporting surface being continuous with a surface of said pole piece spaced from said diaphragm and having a configuration equal to a predetermined maximum elastic deformation of said diaphragm at the position of maximum desired travel of said diaphragm, said supporting surface being adjacent said diaphragm at said position of maximum travel whereby said supporting member supports said diaphragm in a condition of elastic deformation at said position of maximum travel.

7. A pressure sensitive device comprising: a substantially cylindrical housing of non-magnetizable material, a flexible diaphragm mounted within said housing, said diaphragm being affixed in said housing at the periphery of said diaphragm such that the center of said diaphragm is movable within said housing, an electromagnet positioned within said housing and having a pole piece with a surface thereof proximate to, but spaced from, said diaphragm, a supporting member of electrically and magnetically inert rigid material filling said housing, a supporting surface defined by said supporting member, said supporting surface being continuous with said surface of said pole piece and having a configuration equal to a predetermined maximum elastic deformation of said diaphragm at the position of maximum desired travel of said diaphragm at which said diaphragm is in contact with said surface of said pole piece, said supporting surface being adjacent said diaphragm at said position of maximum travel whereby said surface of said pole piece and said supporting surface support said diaphragm in a condition of elastic deformation at said position of maximum desired travel and limit the travel thereof.

References Cited in the file of this patent
UNITED STATES PATENTS

| | | |
|---|---|---|
| 1,402,546 | Steinberger | Jan. 3, 1922 |
| 2,191,121 | Slichter | Feb. 20, 1940 |
| 2,403,535 | Kremer | July 9, 1946 |
| 2,477,801 | Hathaway | Aug. 2, 1949 |